US012432752B2

United States Patent
Du et al.

(10) Patent No.: US 12,432,752 B2
(45) Date of Patent: Sep. 30, 2025

(54) METHODS AND SYSTEMS FOR EXCHANGING INFORMATION FOR SIDELINK COMMUNICATIONS

(71) Applicant: ZTE CORPORATION, Guangdong (CN)

(72) Inventors: Weiqiang Du, Guangdong (CN); Wei Luo, Guangdong (CN); Lin Chen, Guangdong (CN); Boyuan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 381 days.

(21) Appl. No.: 18/105,484

(22) Filed: Feb. 3, 2023

(65) Prior Publication Data

US 2023/0189293 A1    Jun. 15, 2023

Related U.S. Application Data

(63) Continuation of application No. PCT/CN2020/107533, filed on Aug. 6, 2020.

(51) Int. Cl.
*H04W 72/25* (2023.01)
*H04W 72/21* (2023.01)
*H04W 72/40* (2023.01)

(52) U.S. Cl.
CPC ........... *H04W 72/25* (2023.01); *H04W 72/21* (2023.01); *H04W 72/40* (2023.01)

(58) Field of Classification Search
CPC ..... H04W 72/25; H04W 72/40; H04W 72/21; H04W 72/1263; H04W 72/1226; H04W 72/1284; H04W 72/54; H04W 80/02; H04W 24/10; H04W 4/40; H04W 72/23; H04W 92/18; H04L 5/0057; H04L 5/0091; H04B 7/0626; H04B 7/063; H04B 7/0632; H04B 7/0639
See application file for complete search history.

(56) References Cited

U.S. PATENT DOCUMENTS

| | | |
|---|---|---|
| 9,439,203 B1 | 9/2016 | Zhou et al. |
| 2016/0143052 A1* | 5/2016 | Yilmaz ............. H04W 72/1268 370/329 |
| 2018/0376525 A1 | 12/2018 | Feng |
| 2020/0145280 A1* | 5/2020 | Cirik ................... H04L 41/0668 |
| 2020/0170023 A1 | 5/2020 | Kim et al. |
| 2020/0351833 A1* | 11/2020 | Chae ...................... H04W 72/04 |
| 2021/0051653 A1* | 2/2021 | Park ........................ H04W 8/22 |
| 2021/0385805 A1* | 12/2021 | Lee ........................ H04W 72/20 |

(Continued)

FOREIGN PATENT DOCUMENTS

| | | |
|---|---|---|
| CN | 107113756 A | 8/2017 |
| CN | 107710845 A | 2/2018 |

(Continued)

OTHER PUBLICATIONS

WO 2020/190069 A1 (Year: 2020).*

(Continued)

*Primary Examiner* — Rushil P. Sampat

(74) *Attorney, Agent, or Firm* — Crowell & Moring LLP

(57) ABSTRACT

Methods, apparatus, and systems for selecting and establishing sidelink resources amongst UEs. The disclosure provides various systems and methods of exchanging parameters amongst a group of networked UEs in order to schedule resources.

21 Claims, 18 Drawing Sheets

(56) References Cited

U.S. PATENT DOCUMENTS

2022/0007388 A1\* 1/2022 Lee .................. H04W 72/21
2022/0141869 A1\* 5/2022 Jeon ................ H04W 72/0446
370/329

FOREIGN PATENT DOCUMENTS

| CN | 108370565 A | 8/2018 |
|---|---|---|
| CN | 110972301 A | 4/2020 |
| CN | 111328154 A | 6/2020 |
| WO | WO 2020/051807 A1 | 3/2020 |
| WO | WO 2020/101953 A1 | 5/2020 |
| WO | 2021/207459 A1 | 10/2021 |

OTHER PUBLICATIONS

Examination Report, Nov. 22, 2023, pp. 6, Intellectual Property India, New Delhi, India.
LG Electronics Inc; "Draft running CR of 36.321 for eV2X", 3GPP R2-1808560, 3GPP TSG-RAN2 Meeting #102, Busan, Republic of Korea, May 21-25, 2018.
Huawei et al., "Miscellaneous Stage-2 Corrections for NR SL Communication in TS 38.300," 3GPP tsg_ran\wg2_rl2,tsgr2,110-e, 13 pages.
Office action issued in Chinese application No. 202080104208.1, dated Sep. 25, 2024, 22 pages (with English translation).
LG Electronics, "Discussion on resource allocation for Mode 2," 3GPP TSG Ran WG1 #99, R1-1912588, Nov. 2019, 16 pages.
Intel Corporation, "Sidelink Resource Allocation Design for NR V2X Communication," 3GPP TSG RAN WG1 Meeting #96bis, R1-1904296, Apr. 2019, 15 pages.
Office action issed in European application No. 20948876.6, dated Jan. 7, 2025, 8 pages.
Supplementary European Search Report dated Feb. 5, 2024 from European Application No. 20948400.5 (13 pages).
Annoymous. "3rd Generation Partnership Project; Technical Specification Group Radio AccessNetwork; NR; Medium Access Control (MAC) protocol specification (Release 16)," 3GPP Standard; vol. RAN WGI, No. V16.1.0, Jul. 18, 2020, pp. 1-151.
International Search Report issued May 11, 2021 in (PCT) Application No. PCT/CN2020/107533.
Hua Wei et al. "3GPP TSG-RAN WG2 Meeting# 110 Electronic R2-2005465" *Miscellaneous Stage-2 Corrections for NR SL Communication in TS 38.300*, Jun. 12, 2020 (Jun. 12, 2020), section 16.9.2.6.
LG. "3GPP TSG-RAN WG2 #104 R2-1818496" *Report of [103bis#38] SL Unicast/Groupcast (LG)*, Nov. 16, 2018 (Nov. 16, 2018), section 3.
LG Electronics Inc. "3GPP TSG-RAN WG2 Meeting #110-e R2-2005970" *Corrections to 5G V2X with NR Sidelink*, Jun. 12, 2020 (Jun. 12, 2020), section 5.4.4.
LG Electronics Inc. "3GPP TSG-RAN WG2 #108 R2-1916123" *Remaining MAC Issues and Response to RAN1 LS*, Nov. 22, 2019 (Nov. 22, 2019), p. 2.
English-language Office Action issued in European Application No. 20948876.6 dated Jul. 16, 2025 (6 pages).

\* cited by examiner

METHODS AND SYSTEMS FOR EXCHANGING INFORMATION FOR SIDELINK COMMUNICATIONS

This application is a continuation application of PCT International Application No. PCT/CN2020/107533, filed with the China National Intellectual Property Administration, PRC on Aug. 6, 2020, which is herein incorporated by reference in its entirety.

TECHNICAL FIELD

This disclosure is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for communicating in an in a sidelink deployment for New Radio (NR).

The following aspects may be preferably implemented in various embodiments.

In an aspect, a first wireless device transmits a request for scheduling information to a second wireless device receives the scheduling information from the second wireless device.

In an aspect, the scheduling information request or response comprises: (a) the scheduling capability of the second wireless device, or (b) the coverage status of the second wireless device, which includes in coverage or out of coverage, or (c) RRC status of the second wireless device, including idle, inactive, or connected, or (d) a set of transmission resources the second wireless device is, including preconfigured or configured by system information or configured by the second wireless device's base station, or (e) the coverage status of the second wireless device, or (f) the Radio Resource Control (RRC) status of the second wireless device. In yet another aspect, the scheduling information includes a capability of the second wireless device including: (a) whether the second wireless device can provide a resource pool, or (b) whether the second wireless device can provide a transmission grant, or (c) the supported transmission resource selection method of the second wireless device, or including random selected, or sensing, or partial sensing, or dynamic scheduling, or (d) whether the second wireless device can provide a transmission resource for the first wireless device to send data to the second wireless device, or (e) whether the second wireless device can provide a transmission for the second wireless device to send to any destination. In yet another aspect, scheduling information comprises: a PC5 RRC signaling, or a PC5 MAC Control Element (MAC CE), or a PC5 NAS signaling, or a Sidelink Control Information (SCI).

In yet another aspect, the first wireless device receives a request for scheduling information from a base station before transmitting the scheduling information to a second wireless device. In yet another aspect, the first wireless device is configured to send the scheduling information of the second wireless device to a base station after receiving the scheduling information from the second wireless device. In yet another aspect, the first wireless device sends a list including scheduling information for more than one device. In yet another aspect, the first wireless device is a first User Equipment (UE) and the second wireless device is a second UE. In yet another embodiment, the first wireless device is a base station, and the second wireless device is a UE.

In an aspect, the first wireless device transmits a scheduling configuration to a second wireless device and receives configuration response message from the second wireless device. In another aspect, the scheduling configuration comprises: (a) a resource pool configuration, or (b) a service packet information, or (c) a service information, or (d) a scheduling request resource configuration, or (e) a radio bearer configuration, or (f) resource selection information including sensing parameters. In another aspect, the first wireless device connects to multiple devices, and the first wireless device sends a non-overlap SR resource configurations to the multiple devices. In another aspect, the scheduling configuration comprises: (a) a resource pool configuration, or a (b) scheduling request configuration, or (c) a radio bearer configuration obtained. In another aspect, the scheduling configuration obtained via at least one of: preconfigured, or system information or RRC signaling. In another aspect, the configuration response message comprises: (a) a failure indication relating to whether a corresponding configuration failed, or (b) a collision indication relating to whether the scheduling request resource collides with another device, or (c) a scheduling request resource configuration relating to whether the SR resource configuration is commended by the second wireless device.

In another aspect, the first wireless device transmits the configuration response message to a base station. In another aspect, the second wireless device is configured to send the scheduling configuration to a base station.

In an aspect, the first wireless device receives a Scheduling Request (SR) configuration including a sr-ProhibitTimer and a sr-TransMax, wherein an SR_COUNTER is used for a scheduling procedure for the first wireless device. In another aspect, the sr-Prohibit timer is started, the SR_COUNTER is incremented by 1, and the physical layer is instructed to signal the SR to the second wireless device device's scheduling logical channel: (a.1) if the logical channels scheduled by a UE are configured with a different SR for the SR configuration corresponding to a pending SR, or (a.2) if the logical channels scheduled by the UE are configured with the same SR configuration for the SR configuration corresponding to the pending SR configuration, and the sr-ProhibitTimer and SR_COUNTER corresponding to the UE scheduling channel triggers the pending SR configuration, and (c) if the sr-ProhibitTimer is not running at the time of the SR transmission, and (d) if the SR_COUNTER<sr-TransMax. In yet another aspect, a second wireless device is configured to provide a sidelink grant received from a base station after receiving the SR configuration from the first wireless device, wherein the second wireless device is further configured to send the SR to the base station. In yet another aspect, the first wireless device is configured to associate one sr-ProbihitTimer and one SR_COUNTER to one SR configuration if logical channels scheduled by a UE is configured via a different SR configuration. In yet another aspect, the first wireless device is configured to associate one sr-PorhibitTimer and one SR_COUNTER to one SR configuration for every UE if logical channels scheduled by a UE is configured via the same SR configuration In an aspect, a first wireless device receives a sidelink grant from a second wireless device and selects a destination based on the highest priority of a logical channel or a MAC CE of the logical channel for each new transmission, and selects data belong to the selected destination to create a MAC PDU. In yet another aspect, the destination is one of: unicast, or broadcast, or groupcast. In yet another aspect, the sidelink grant is created by the second wireless device via: sensing, or partial sensing, or random selection. In yet another aspect, the sidelink grant has been received by the second wireless device via a base station. In yet another aspect, the destination is selected based on a logical channel having the priority or a MAC CE, wherein the logical channel is scheduled by the second wireless device that provides the sidelink grant.

In an aspect, the first wireless device transmits an indication relating to a transmission grant from one or more devices, wherein one or more devices are configured to provide a transmission grant capability to the first wireless device receives transmission grant capability. In yet another aspect, the sidelink grant is provided by the one of the one or more wireless devices and can only be used by the logical channel that has data transmitting to the one of the one or more wireless devices if one of the one or more wireless devices are capable of scheduling only their own data. In yet another aspect, the sidelink grant is provided by the one of the one or more wireless and can be used by all of the first wireless device's logical channels if one of the one or more wireless devices are capable of scheduling their own data and the first wireless device's data. In yet another aspect, the sidelink grant is provided by the one of the one or more wireless devices and can be used by the logical channel with data transmitting to the one of the one or more wireless devices if one of the one or more wireless devices is not capable of scheduling, and the first wireless device finds another device to schedule all of the first wireless device's traffic.

In an aspect, the first wireless device transmits a broadcast of an assistance scheduling request and receives a response to the broadcast from a second wireless device and establishes the first wireless device, a unicast connection with the second wireless device. In yet another aspect, the assistance scheduling request comprises an indication that a scheduling measurement for all of the first wireless device's traffic will be or is provided. In yet another aspect, the broadcast is a groupcast within devices connected to the first wireless device. In yet another aspect, the first wireless device checks whether a device has a unicast link with of the first wireless device and is capable of providing assistance scheduling information and, if not, sends an assistance scheduling request as a groupcast within the first wireless device's group and, if no response is received, broadcasting the request. In yet another aspect, the response comprises: (a) an indication that the second wireless device can provide an scheduling for all of the first wireless device's traffic, or (b) a destination layer 2 ID of the second wireless device, or (c) a resource selection mode, including sensing or partial sensing or scheduling by base station, or (d) a coverage state, including in coverage or out of coverage, or (e) RRC states, including an RRC connection or an RRC idle, or an RRC inactive. In yet another aspect, the first wireless device receives multiple response messages from a plurality of wireless devices, wherein the first wireless device chooses one of the plurality of wireless devices based on an ordered priority to establish a unicast connection, wherein the plurality includes the second wireless device. In yet another aspect, the ordered priority is: (1) an RRC connection, (2) an RRC inactive, and then (3) an RRC idle, wherein the RRC connection is the highest priority, the RRC inactive is the second highest priority, and the RRC idle is the third highest priority. In yet another aspect, the ordered priority is: (1) a sensing, and then (2) a partial sensing, wherein the sensing is the highest priority, and the partial sensing is the second highest priority. In yet another aspect, the ordered priority is: (1) in coverage, and then (2) out of coverage, where in coverage is the highest priority, and out of coverage is the second highest priority. In yet another aspect, the second wireless device shall be prioritised to be chosen in accordance with the following order (highest priority listed first): (1) header UE within same group a the first wireless device, (2) the second wireless device within the same group as the first wireless device, and (3) the second wireless device without any unicast or groupcast connection with the first wireless device.

In an aspect the first wireless device obtains as grant for resources and performs, a logical channel prioritization. In yet another aspect, the first wireless obtains the grant from a base station. In yet another aspect, the first wireless obtains the grant via its own self creation. In yet another aspect, the first wireless obtains the grant from a UE that is capable of scheduling for itself. In yet another aspect, the first wireless obtains the grant from a UE that is capable of scheduling for itself and another UE.

In another aspect, the first wireless device selects a unicast, groupcast, or broadcast, having the logical channel with the highest priority or the MAC CE among the logical channels that satisfy certain conditions and MAC CEs, if any, for the grant associated to the SCI, wherein the conditions include: (a) the logical channel is configured or determined by a second wireless device providing the grant, or (b) the logical channel is configured or determined to be scheduled by a base station providing the grant, or (c) the logical channel is configured or determined to be used by the first wireless device. In yet another aspect, the first wireless device selects the logical channels that satisfy all the following conditions among the logical channels belonging to the selected destination: (a) the logical channel is configured or determined to be scheduled by a second wireless device providing the grant, (b) the logical channel is configured or determined to be scheduled by a base station providing the grant, or (c) the logical channel is configured or determined to be used by the first wireless device.

In yet another aspect, the first wireless device is configured to use a MAC CE.

In aspects of the disclosure, the transmission and reception of messages is performed by various devices, including MT, UE, and base stations.

These, and other, aspects are described in the present disclosure.

DETAILED DESCRIPTION

The disclosure relates to wireless systems. More specifically, it relates to communications between UE for side link communication, and for the scheduling of resources. Parameters are exchanged by one UE to another so that the UE can be configured.

Figure 1:
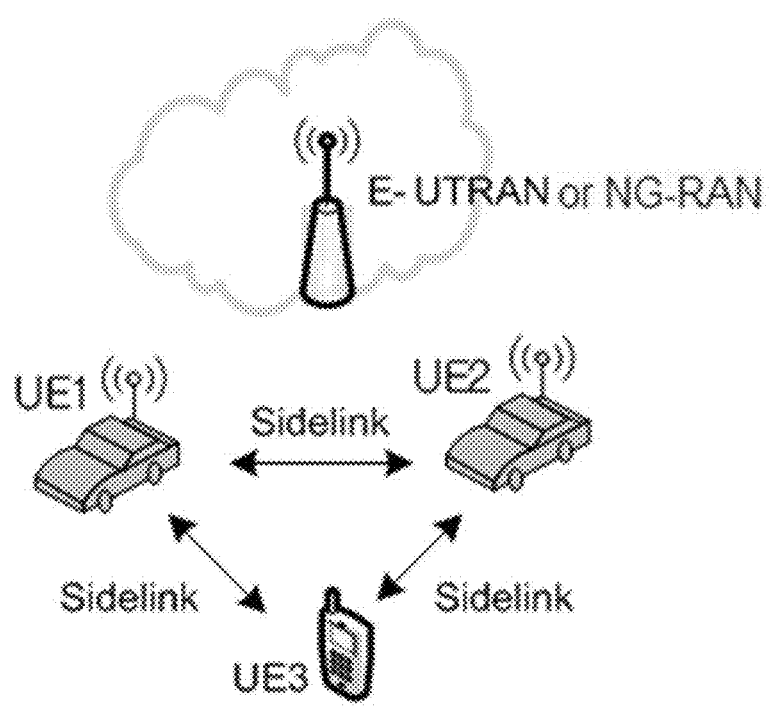
FIG. 1 illustrates an example V2X communication system.

FIG. 1 is a block diagram of an example V2X communication system. In the LTE (Long Term Evolution)-based V2X communications study organized by 3GPP, user-based devices (User Equipment) may communicate using V2X communication between a direct/sidelink link. For example, data may not be forwarded by the base station and the core network, and may be directly transmitted by the source UE to the target UE through an air interface (PC5 interface), as shown in FIG. 1.

With the advancement of communication technology and the development of the automation industry, the V2X communication scenario is further extended and has higher performance requirements. 3GPP has established research on vehicle networking communication based on advanced V2X services of the fifth-generation mobile communication technology (5G), including 5G air interface-based vehicle networking communication and 5G direct link (sidelink)-based vehicle networking communication.

For NR-based vehicle to everything (V2X) sidelink communications, PC5 interface RRC signaling interaction may be supported. Specifically, PC5 RRC signaling may include a message for transmitting capability of UEs. The present embodiments relates to obtaining peer UE's capability information and interacting for PC5 UE capability information exchange for sidelink transmission parameters selection. In addition, PC5 RRC signaling may not be transmitted without security protection, and the present embodiments may provide a security protection mechanism for protecting PC5 RRC signaling at the access-stratum (AS) layer.

It should be understood that any type of UEs can be used, as known in the art, and that the specific hardware is not limited to the configurations described herein. It should also be understood that any configurations, and numbers, of networked devices can be used.

Figure 2:
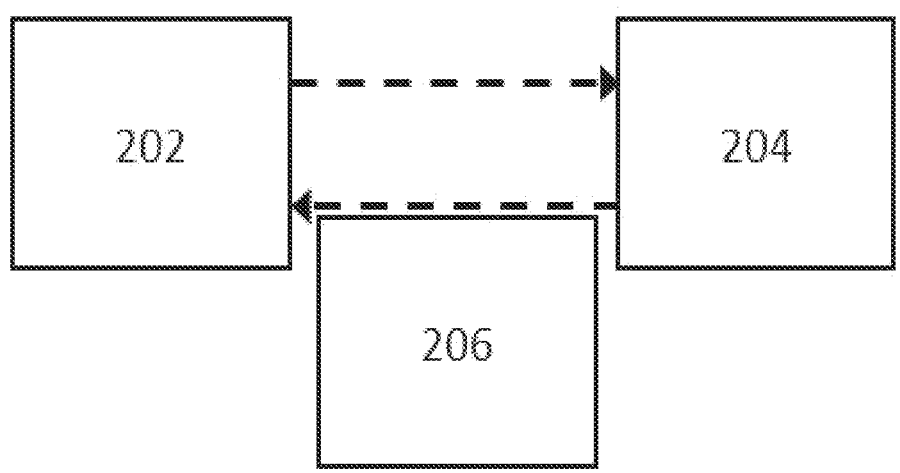
FIG. 2 illustrates the exchange of scheduling information.

FIG. 2 illustrates the exchange of scheduling information. UE 202 transmits a request for scheduling information to UE 204 and receives the scheduling information 206 from UE 204. The scheduling information request and response includes information, which includes any of the: (a) the scheduling capability of the UE 204, or (b) the coverage status of the UE 204, which includes in coverage or out of coverage, or (c) RRC status of the UE 204, including idle, inactive, or connected, or (d) a set of transmission resources the UE 204 is, including preconfigured or configured by system information or configured by the UE 204's base station, or (e) the coverage status of the UE 204, or (f) the Radio Resource Control (RRC) status of the UE 204. In yet another aspect, the scheduling information includes a capability of the UE 204 including: (a) whether the UE 204 can provide a resource pool, or (b) whether the UE 204 can provide a transmission grant, or (c) the supported transmission resource selection method of the UE 204, or including random selected, or sensing, or partial sensing, or dynamic scheduling, or (d) whether the UE 204 can provide a transmission resource for the UE 202 to send data to the UE 204, or (e) whether the UE 204 can provide a transmission for the UE 204 to send to any destination. In yet another aspect, scheduling information comprises: a PC5 RRC signaling, or a PC5 MAC Control Element (MAC CE), or a PC5 NAS signaling, or a Sidelink Control Information (SCI).

In an embodiment, UE 202 transmits a scheduling configuration to a UE 204 and receives configuration response message from the UE 204. In another aspect, the scheduling configuration comprises: (a) a resource pool configuration, or (b) a service packet information, or (c) a service information, or (d) a scheduling request resource configuration, or (e) a radio bearer configuration, or (f) resource selection information including sensing parameters. In another aspect, the UE 202 connects to multiple devices, and the UE 202 sends a non-overlap SR resource configurations to the multiple devices. In another aspect, the scheduling configuration comprises: (a) a resource pool configuration, or a (b) scheduling request configuration, or (c) a radio bearer configuration obtained. The scheduling configuration obtained via at least one of: preconfigured, or system information or RRC signaling. In another aspect, the configuration response message comprises: (a) a failure indication relating to whether a corresponding configuration failed, or (b) a collision indication relating to whether the scheduling request resource collides with another device, or (c) a scheduling request resource configuration relating to whether the SR resource configuration is commended by the UE 204.

In an embodiment, UE 202 has a SR configuration including a sr-ProhibitTimer and a sr-TransMax, wherein an SR_COUNTER is used for a scheduling procedure for the UE 202. The SR configuration can be received from other UE or base station. Here, the sr-Prohibit timer is started, the SR_COUNTER is incremented by 1, and the physical layer is instructed to signal the SR to the UE 204: (a.1) if the logical channels scheduled by a UE are configured with a different SR for the SR configuration corresponding to a pending SR, or (a.2) if the logical channels scheduled by the UE are configured with the same SR configuration for the SR configuration corresponding to the pending SR configuration, and the sr-ProhibitTimer and SR_COUNTER corresponding to the UE scheduling channel triggers the pending SR configuration, and (c) if the sr-ProhibitTimer is not running at the time of the SR transmission, and (d) if the SR_COUNTER<sr-TransMax. In an embodiment, the UE 202 is configured to associate one sr-PorhibitTimer and one SR_COUNTER to one SR configuration for every UE if logical channels scheduled by a UE is configured via the same SR configuration. In yet another embodiment, the UE 302 is configured to associate one sr-ProbihitTimer and one SR_COUNTER to one SR configuration if logical channels scheduled by a UE is configured via a different SR configuration.

Figure 3:
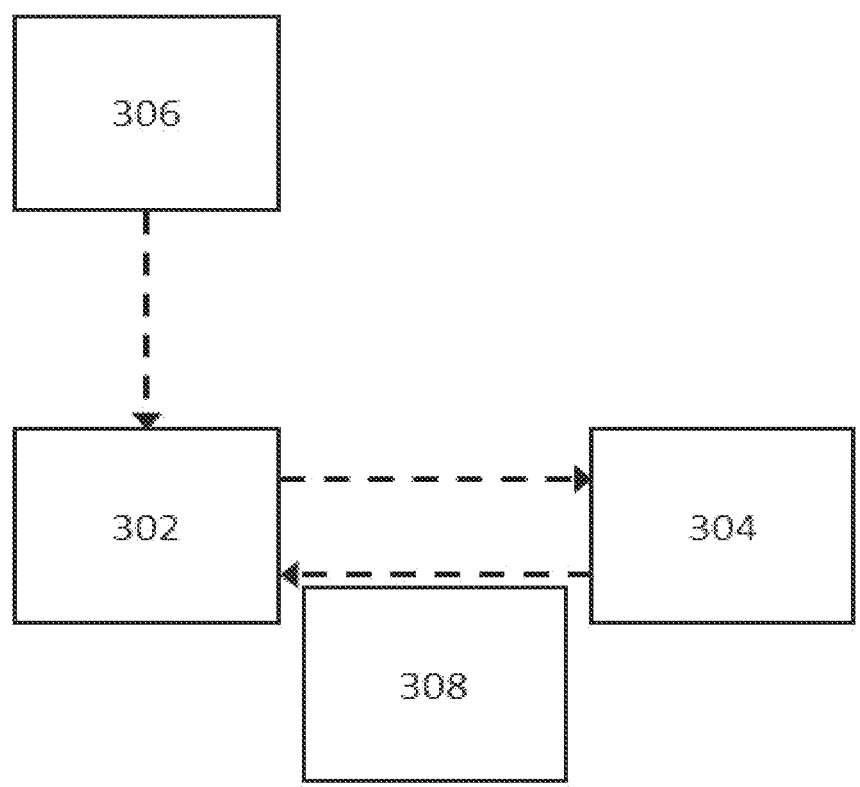
FIG. 3 illustrates scheduling information from a base station.

In an aspect, a UE 202 receives a sidelink grant from a UE 204 and selects a destination having the logical channel with the highest priority or the MAC CE, among the logical channels that satisfy the specific condition and MAC CE(s). In one embodiment, a UE 202 select logical belong to the selected destination and satisfy the specific condition to create a MAC PDU. In yet another aspect, the destination is associated with one of: unicast, or broadcast, or groupcast. In yet another aspect, the sidelink grant is created by the UE 204 via: sensing, or partial sensing, or random selection. In yet another aspect, the sidelink grant has been received by the UE 204 via a base station. In yet another aspect, the specific condition is: the logical channel scheduled by the UE or base station or it self that provides the sidelink grant FIG. 3 illustrates scheduling information from a base station. UE 302 receives a request for scheduling information from a base station 306 before transmitting the scheduling information request to a UE 304. UE 302 sends scheduling information 308 of the UE 304 to a base station 306 after receiving the scheduling information from the UE 304. UE 302 can also send a list of scheduling information for more than one device. In another embodiment, UE 304 is configured to provide a sidelink grant received from base station 306 after receiving the SR configuration from the UE 302, wherein UE 304 is further configured to send the SR to the base station 306.

Figure 4:
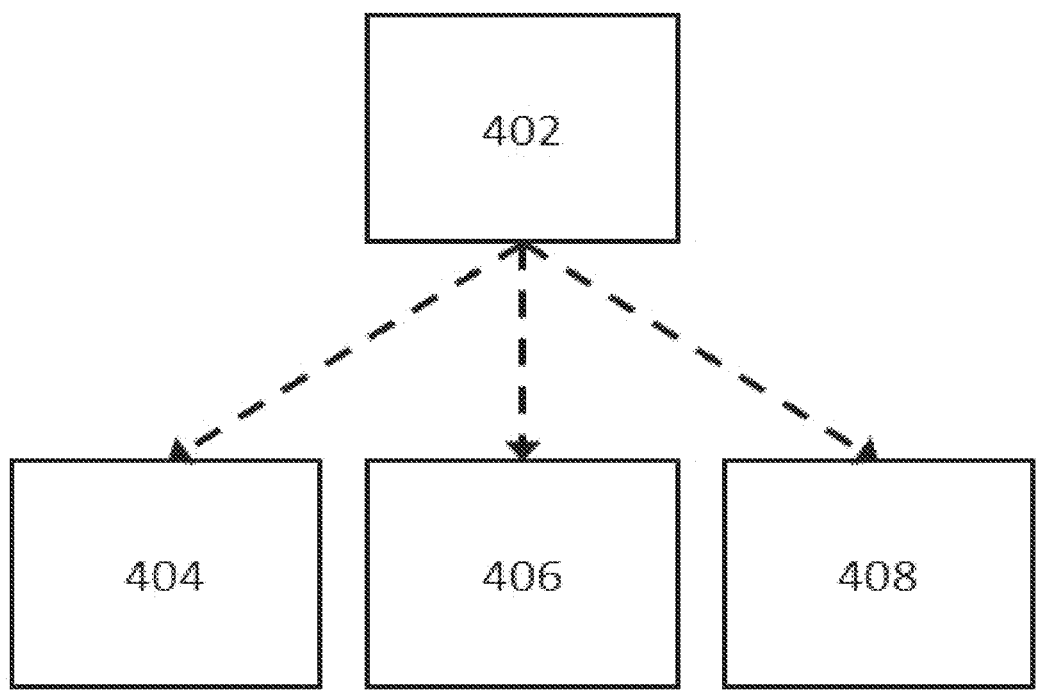
FIG. 4 illustrates a plurality of UEs connected to a UE.

FIG. 4 illustrates a plurality of UEs connected to a UE. In an embodiment, a sidelink grant is provided by UE 404, UE 406, or UE 406. In an embodiment, the grant is used by the logical channel that has data transmitting UE 404, UE 406, or UE 406 respectively if UE 404, UE 406, or UE 406 are capable of scheduling only their own data. In another embodiment, the sidelink grant is provided by the UE 404, UE 406, or UE 406 and can be used by all of the UE 402's logical channels if UE 404, UE 406, or UE 406 are capable of scheduling their own data and the other UE 402's data. In another embodiment, the sidelink grant is provided by UE 404, UE 406, or UE 406 and can be used by the logical channel with data transmitting to UE 404, UE 406, or UE 406 if UE 404, UE 406, or UE 406 is not capable of scheduling, and the UE 402 finds another device to schedule all of the UE 402's traffic.

In another embodiment, UE 402 transmits a broadcast of an assistance scheduling request, and receives a response to the broadcast from one of UE 404, UE 406, or UE 406 and establishes a unicast connection with the UE that responded. In another embodiment, a scheduling request comprises an indication that a scheduling measurement for all of the UE 402's traffic will be or is provided. In yet another aspect, the broadcast is a groupcast within devices connected to UE 402. In yet another aspect, UE 402 checks whether UE 404, UE 406, or UE 406 has a unicast link with UE 202 and is capable of providing assistance scheduling information and, if not, sends an assistance scheduling request as a groupcast within UE 402's group (UE 404, UE 406, or UE 406) and, if no response is received, broadcasting the request. The response from any of the UEs comprises any of the: (a) an indication that the UE can provide scheduling for all of UE 202's traffic, or (b) a destination layer 2 ID of the UE, or (c) a resource selection mode, including sensing or partial sensing or scheduling by base station, or (d) a coverage state, including in coverage or out of coverage, or (e) RRC states, including an RRC connection or an RRC idle, or an RRC inactive.

In some embodiments, UE 402 receives multiple response messages from UE 404, UE 406, and UE 406. Here UE 402 chooses one of UE 404, UE 406, or UE 406 based on an ordered priority to establish a unicast connection. The priority can be: (1) an RRC connection, (2) an RRC inactive, and then (3) an RRC idle, or can be: (1) a sensing, and then (2) a partial sensing, wherein the sensing is the highest priority, and the partial sensing is the second highest priority, or the ordered priority can be: (1) in coverage, and then (2) out of coverage, where in coverage is the highest priority, and out of coverage is the second highest priority. In yet another embodiment, UE 404, UE 406, or UE 406 shall be prioritised to be chosen in accordance with the following order (highest priority listed first): (1) header UE within same group as UE 402, (2) UE 404, UE 406, or UE 406 within the same group as UE 402, and (3) UE 404, UE 406, or UE 406 without any unicast or groupcast connection with UE 402.

In an embodiment, UE 402 obtains as grant for resources and performs, a logical channel prioritization. In an embodiment, UE 402 obtains the grant from a base station. In yet another embodiment, UE 402 obtains the grant via its own self creation. In yet another aspect, the UE 402 obtains the grant from UE 404, UE 406, or UE 406 that is capable of scheduling for itself. In yet another aspect, UE 402 obtains the grant from a UE that is capable of scheduling for itself and another UE.

In an embodiment, UE 402 selects a Destination associated with unicast, groupcast, or broadcast, having the logical channel with the highest priority or the MAC CE among the logical channels that satisfy certain conditions and MAC CEs, if any, for the grant associated to the SC1, wherein the conditions include: (a) the logical channel is configured or determined by a UE 404, UE 406, or UE 406 providing the grant, or (b) the logical channel is configured or determined to be scheduled by a base station providing the grant, or (c) the logical channel is configured or determined to be used by UE 402. In another embodiment, UE 402 selects the logical channels that satisfy all the following conditions among the logical channels belonging to the selected destination: (a) the logical channel is configured or determined to be scheduled by UE 404, UE 406, or UE 406 providing the grant, (b) the logical channel is configured or determined to be scheduled by a base station providing the grant, or (c) the logical channel is configured or determined to be used by the UE 402. In an embodiment, UE 402 is configured to use a MAC CE.

Figure 5:
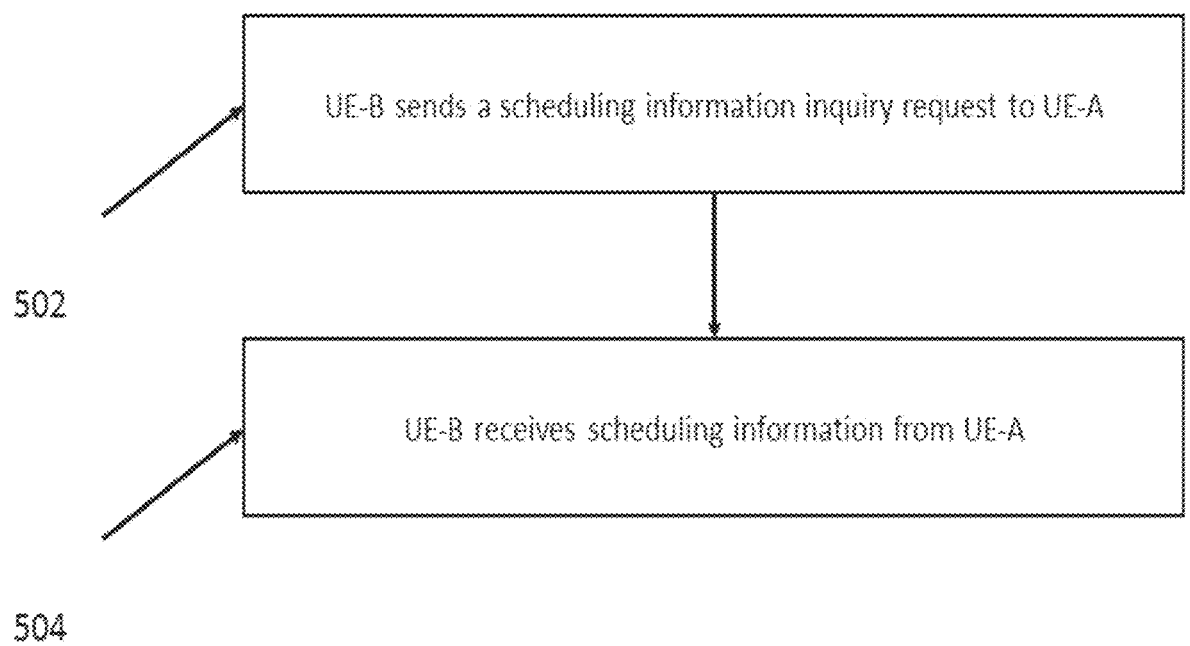
FIG. 5 illustrates a UE-B inquiring about UE-A's scheduling information.

FIG. 5 illustrates a UE-B inquiring about UE-A's scheduling information. In step 502, UE-B sends a scheduling information inquiry request to UE-A. In step 504, UE-B receives scheduling information from UE-A.

In an embodiment, the scheduling information inquiry request includes any of: the scheduling capability of UE-A, or coverage status of UE-A: in coverage, out of coverage, or RRC status of UE-A: idle, inactive, connected, or a set of transmission resources UE-A is: (pre-) configured, configured by system information, or configured by UE-A's base station. In an embodiment, the scheduling capability of UE-A includes any of:

Whether UE-A can provide a resource pool

Whether UE-A can provide a transmission grant.

Supported transmission resource selection method of UE-A: random selected, sensing, partial sensing, dynamic scheduling by base station.

Whether UE-A can provide transmission resource for UE-B to send data to UE-A

Whether UE-A can provide transmission resource for UE-B to send data to any UE

In an embodiment, the response information with respect to step 504 can include any of:
The scheduling capability of UE-A
Coverage status of UE-A: in coverage, out of coverage
RRC status of UE-A: idle, inactive, connected
A set of transmission resources UE-A is: (pre-)configured, configured by system information, or configured by UE-A's base station.
The coverage status of UE-A
The RRC status of UE-A In an embodiment, the scheduling capability of UE-A can include:
Whether UE-A can provide a resource pool
Whether UE-A can provide a transmission grant.
Supported transmission resource selection method of UE-A: random selected, sensing, partial sensing, dynamic scheduling by base station.
Whether UE-A can provide transmission resource for UE-B to send data to UE-A
Whether UE-A can provide transmission resource for UE-B to send data to any UE In an embodiment, UE-B receives the information in any of the following ways: PC5 RRC signaling, PC5 MAC CE, PC5 NAS signaling, SCI.

Figure 6:
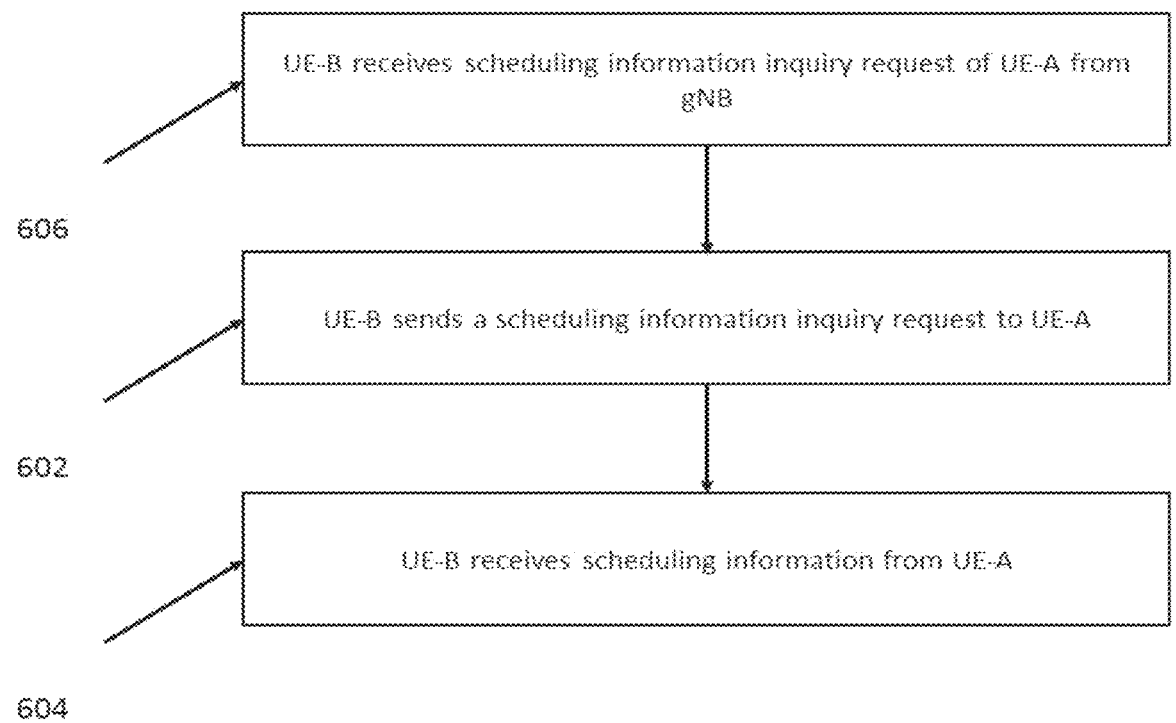
FIG. 6 illustrates a flowchart similar to FIG. 5.

FIG. 6 illustrates a flowchart similar to FIG. 5. However, prior to step 602, step 606 occurs where UE-B receives scheduling information inquiry request of UE-A from gNB. After step 602, the content of the scheduling information is similar with the process described with FIG. 5.

Figure 7:
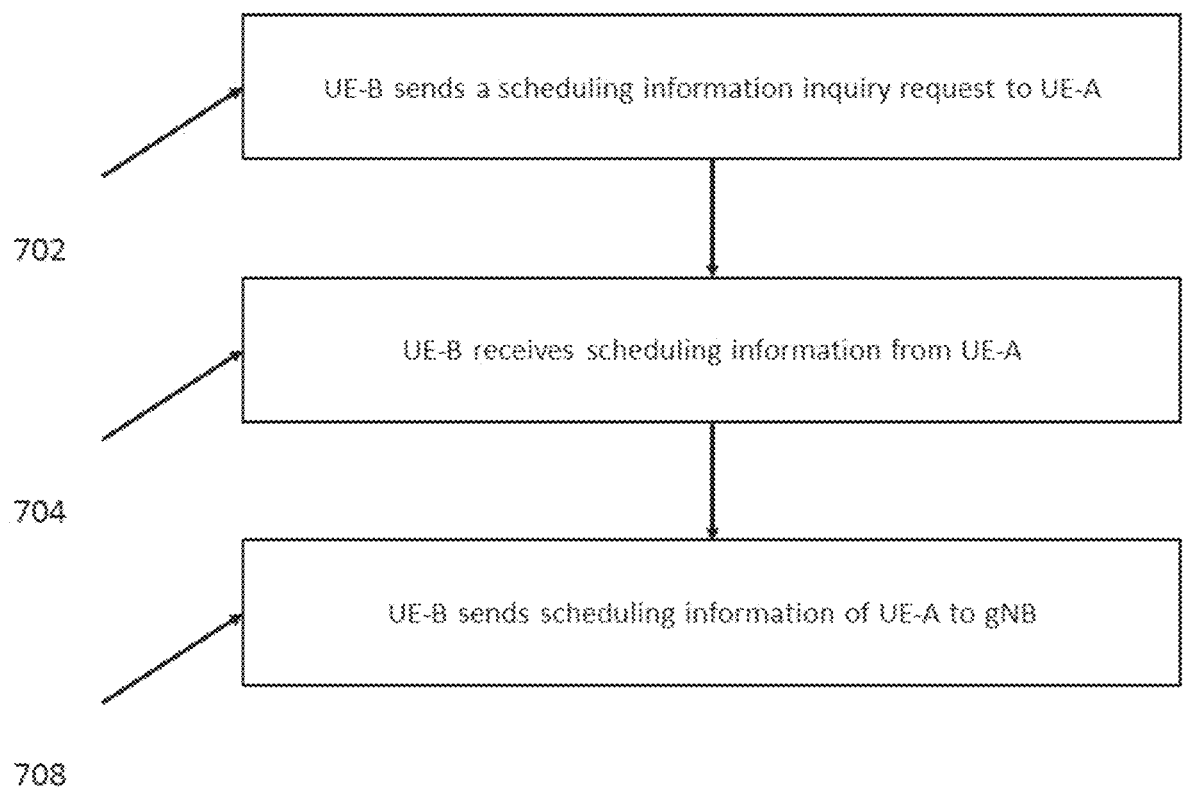
FIG. 7 illustrates a flowchart similar to FIG. 5.

FIG. 7 illustrates a flowchart similar to FIG. 5. However, after step 704, in step 708 the UE-B sends scheduling information of UE-A to gNB.

In an embodiment, UE-B sends a list including the scheduling information of multiple UEs.

Figure 8:
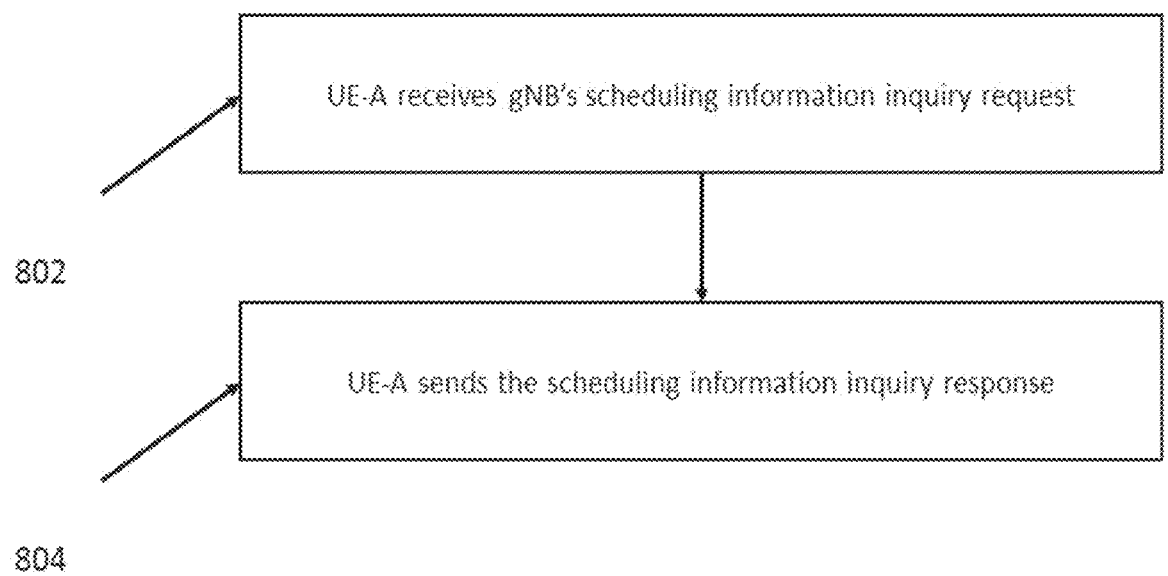
FIG. 8 illustrates a flowchart showing UE-A sending scheduling information.

In an embodiment, the scheduling information includes any of the following:
The scheduling capability of UE-A
Coverage status of UE-A: in coverage, out of coverage
RRC status of UE-A: idle, inactive, connected
A set of transmission resources UE-A is: (pre-)configured, configured by system information, or configured by UE-A's base station.
The coverage status of UE-A
The RRC status of UE-A In an embodiment, the scheduling capability of UE-A includes any of the following:
Whether UE-A can provide a resource pool
Whether UE-A can provide a transmission grant.
Supported transmission resource selection method of UE-A random selected, sensing, partial sensing, dynamic scheduling by base station.
Whether UE-A can provide transmission resource for UE-B to send data to UE-A
Whether UE-A can provide transmission resource for UE-B to send data to any UE FIG. 8 illustrates a flowchart showing UE-A sending scheduling information. In step 802, UE-A receives gNB's scheduling information inquiry request. In step 804, UE-A sends the scheduling information inquiry response. It should be understood that the scheduling information inquiry request and response can be of any of the disclosures.

Figure 9:
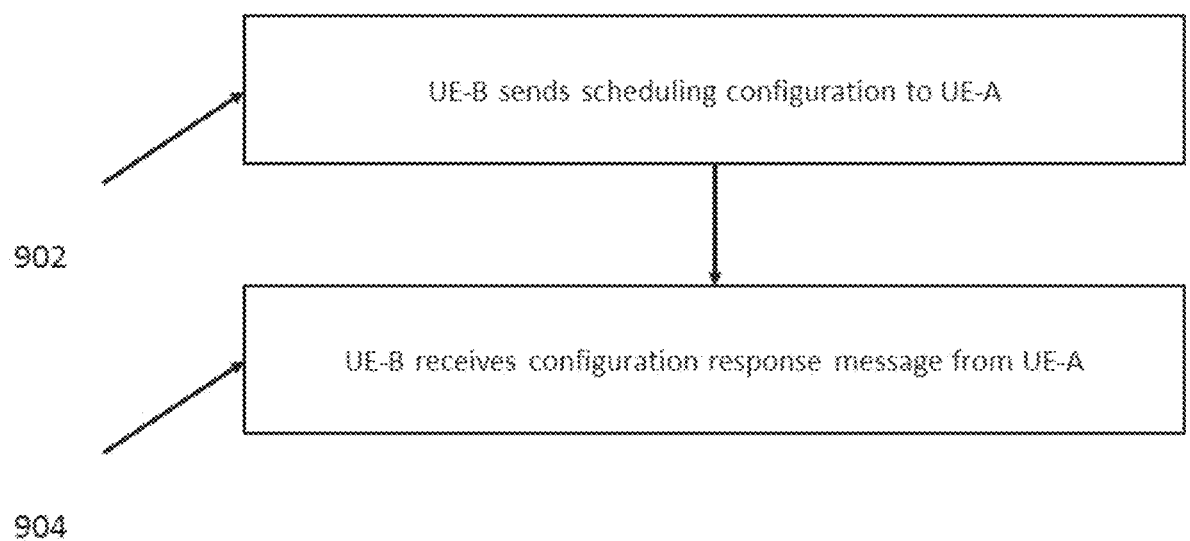
FIG. 9 illustrates a flowchart where UE-B sends a scheduling configuration to UE-A.

FIG. 9 illustrates a flowchart where UE-B sends a scheduling configuration to UE-A. In step 902, UE-B sends scheduling configuration to UE-A. In step 904, UE-B receives configuration response message from UE-A.

In an embodiment, the scheduling configuration comprises any of the following:
Resource Pool Configuration
Service packet information (UAI)
Service information (SUI)
Scheduling Request resource configuration
Radio bearer configuration
Resource selection information (sensing parameters)

In another embodiment, for the case that UE-B connects multiple UE-As, UE-B sends non-overlap SR resource configurations to different UE-As.

In another embodiment, the resource pool configuration, scheduling request configuration, radio bearer configuration can be obtained through at least one of the following methods: (pre-)configured, system information, RRC signaling.

In an embodiment, the configuration response message comprises any of:
Failure indication: Whether corresponding configuration is failed
Collision indication: Whether scheduling request resource collide with other UE
Scheduling request resource configuration: SR resource configuration recommended by UE-A In an embodiment, In one embodiment, the UE-B may send the configuration response message to base station.

Figure 10:
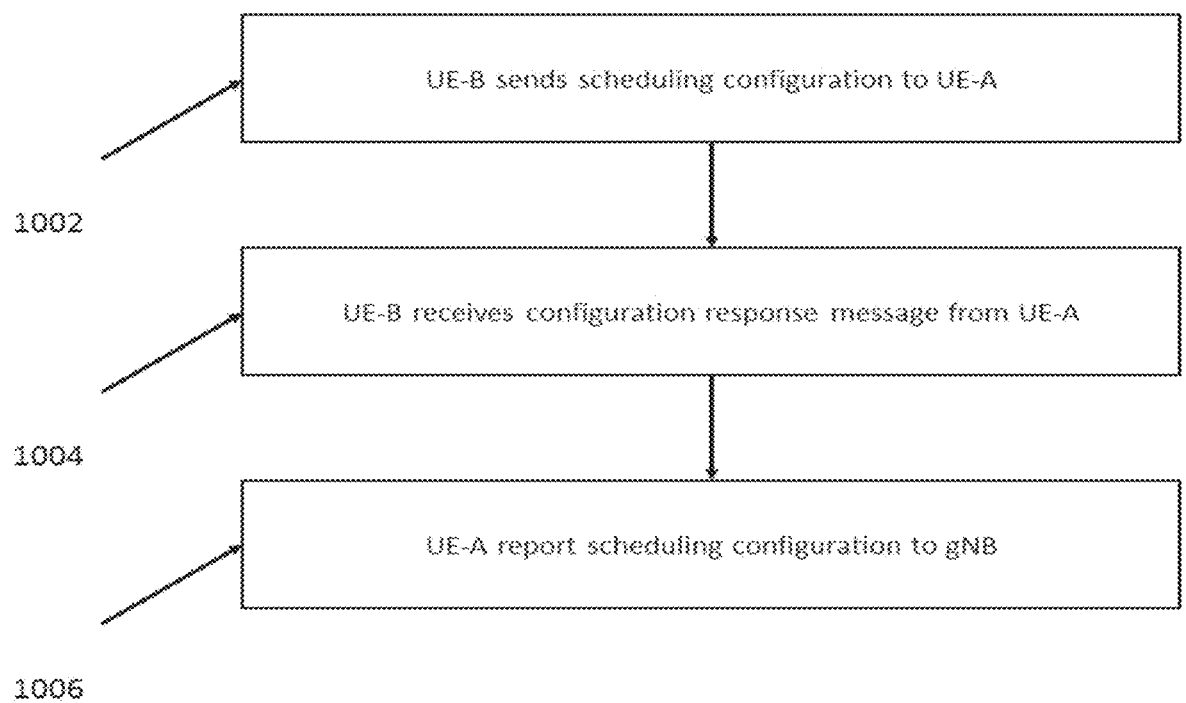
FIG. 10 illustrates a flowchart similar to that of FIG. 9.

FIG. 10 illustrates a flowchart similar to that of FIG. 9, but it includes step 1006, of the UE-A sending the report scheduling configuration to a gNB.

Figure 11:
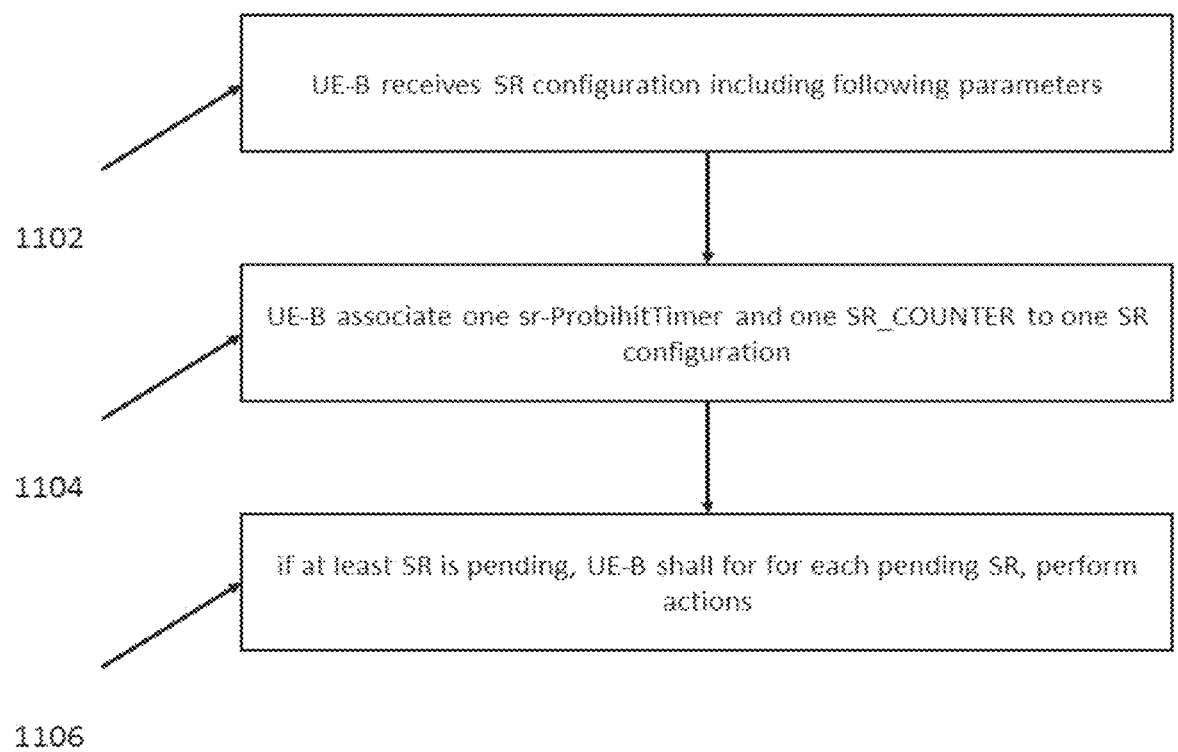
FIG. 11 illustrates a flowchart where the UE-B sends SR.

FIG. 11 illustrates a flowchart where the UE-B sends SR. In step 1102, UE-B receives SR configuration including following parameters. In step 1104, UE-B associate one sr-ProbihitTimer and one SR_COUNTER to one SR configuration. In step 1106, if at least SR is pending, UE-B shall for each pending SR, perform actions.

In an embodiment, the SR configuration includes sr-ProhibitTimer and sr-TransMax. The following UE variables are used for UE-B's scheduling request procedure: SR_COUNTER.

In an embodiment, if logical channels are scheduled by a different UE-A is configured with different SR configuration, UE-B associates one sr-ProbihitTimer and one SR_COUNTER to one SR configuration. In an embodiment, if logical channels are scheduled by different UE-A are configured with same SR configuration, UE-B associate one sr-PorhibitTimer and one SR_COUNTER to one SR configuration for every UE-A.

In an embodiment, the actions performed are according to:
If logical channels scheduled by different UE-A is configured with different SR configuration, for the SR configuration corresponding to the pending SR: or;
if logical channels scheduled by different UE-A is configured with same SR configuration, for the SR configuration corresponding to the pending SR, and for sr-ProhibitTimer and SR_COUNTER corresponding to UE-A scheduling logical channel triggering the pending SR:
and if sr-ProhibitTimer is not running at the time of the SR transmission occasion:
and if SR_COUNTER<sr-TransMax:
then instruct the physical layer to signal the SR to UE-A scheduling logical channel triggering the SR on one valid SR resource;
then increment SR_COUNTER by 1;
then start the sr-ProhibitTimer.

Figure 12:
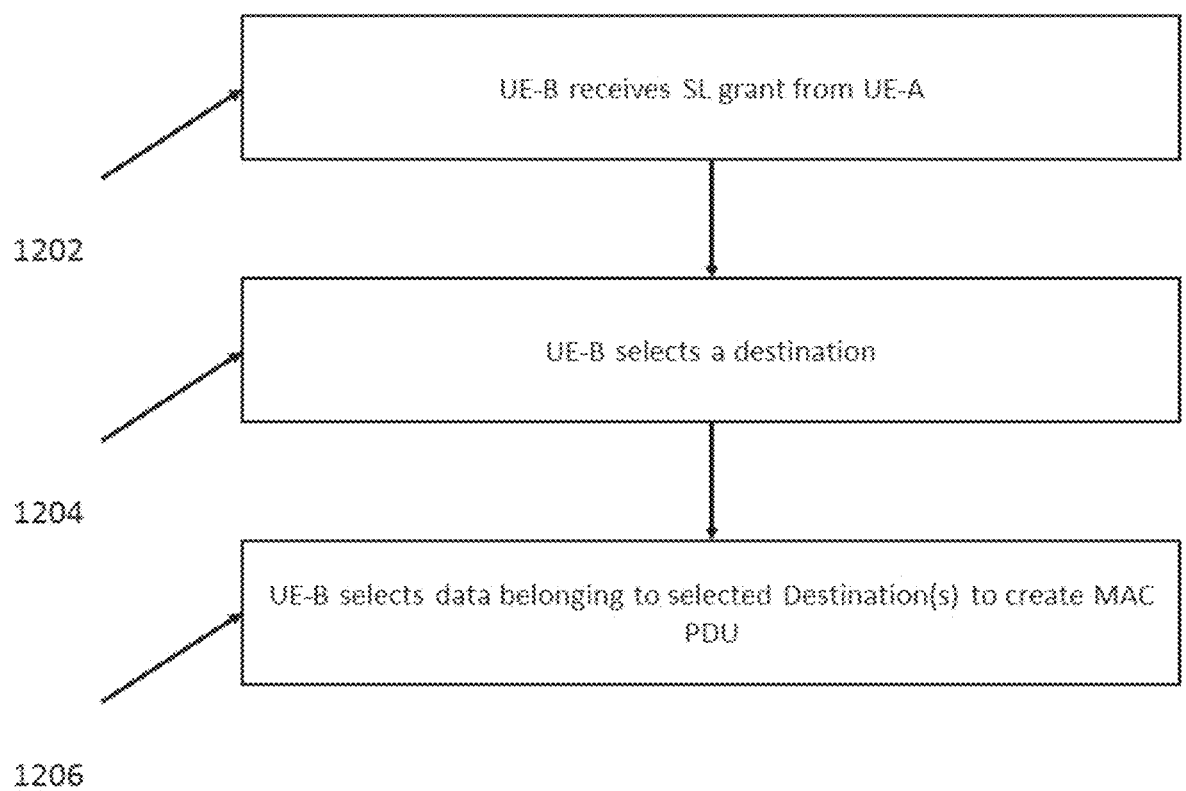
FIG. 12 illustrates a UE-B using Logical Channel Prioritization (LCP).

In another embodiment, when UE-A determines providing sidelink grant received from a base station, after receiving SR from UE-B, UE-A sends the SR to base station FIG. 12 illustrates a UE-B using Logical Channel Prioritization (LCP). In step 1202, UE-B receives SL grant from UE-A. In step 1204, UE-B selects a destination associated to one of unicast, groupcast and broadcast, having the logical channel with the highest priority or the MAC CE, among the logical channels that satisfy all the following conditions and MAC CE(s), if any, for the SL grant associated to the SCI: The logical channel is scheduled by UE-A providing SL grant. In step 1206, UE-B selects data belonging to selected Destination(s) to create MAC PDU.

Figure 13:
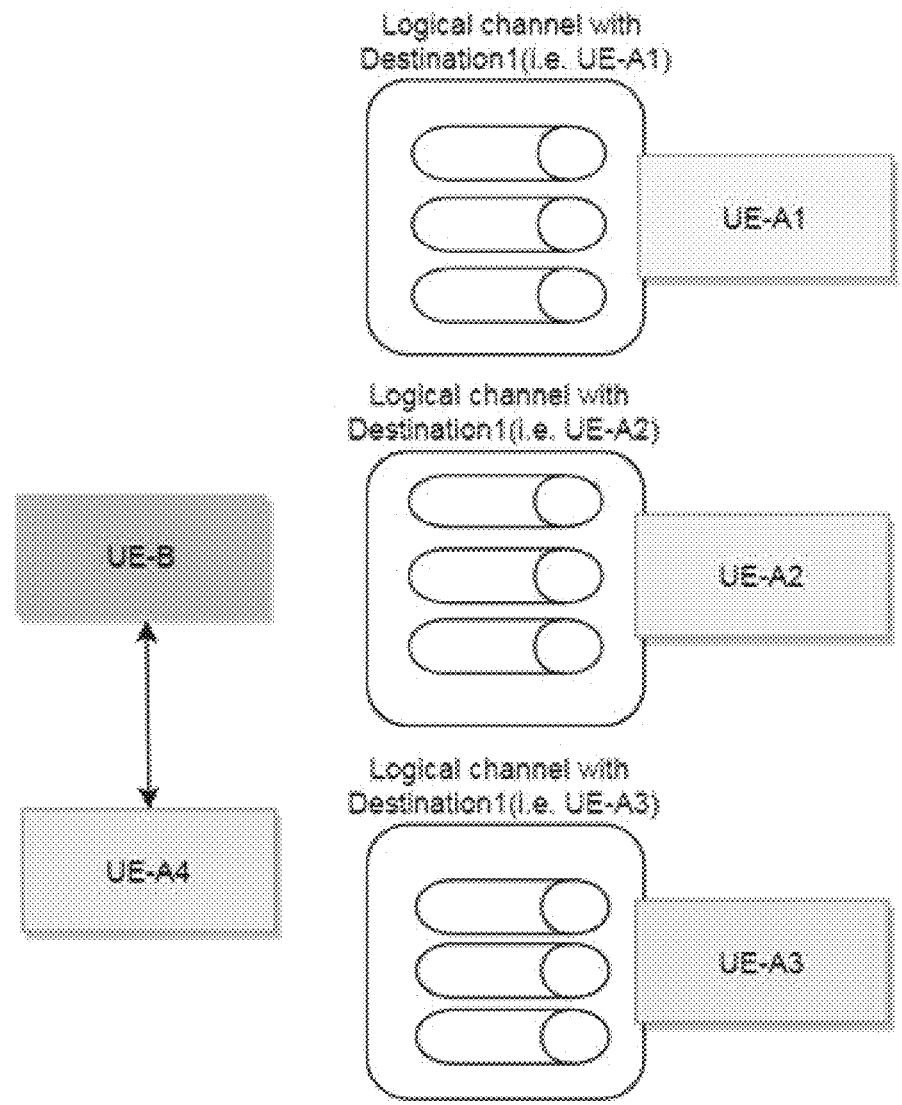
FIG. 13 illustrates multiple UEs.

FIG. 13 illustrates multiple UEs.

In an embodiment, UE-B determines which logical channel will be schedule by specific UE-A according to the rules:
- If UE-A is capable of scheduling it's own data only, the sidelink grant provided by UE-A can only be used by the logical channel with data transmitting to the UE-A.
- If UE-A is capable of scheduling it's own data and other UE's data, the sidelink grant provided by UE-A can be used by all UE-B's logical channel.
- If UE-A is not capable of scheduling, and UE-B find another UE-A to schedule all UE-B's traffic, the sidelink grant provided by UE-A can be used by the logical channel with data transmitting to the UE-A.
- If UE-A is not capable of scheduling, and UE-B can not find another UE-A with capability of schedule all UE-B's traffic, and UE-B In an embodiment, UE-A4 only provides assistance resource for other UEs and UE-B wants to transmit data to UE-A1, A2, A3, but UE-B has no data to transmit to UE-A4. Here:
- Logical channel in UE-B is used to store the data that will be transmitted to UE-A1 has destination1.
- Logical channel in UE-B is used to store the data that will be transmitted to UE-A1 has destination2.
- Logical channel in UE-B is used to store the data that will be transmitted to UE-A1 has destination3.
- Provided below are exemplary scenarios.
- Scenario1: UE-B wants to transmit data to UE-A1,A2,A3.
- UE-A1,A2,A3 are not capable of scheduling, but UE-A4 is capable of scheduling for itself and other UE. Therefore, UE-B may determine data of logical channel with Destination1,2,3 will be scheduled by UE-A4.
- Scenario2: UE-B wants to transmit data to UE-A1,A2,A3.
- UE-A1,A2 are not capable of scheduling, but UE-A3 is capable of scheduling for itself and other UE. Therefore, UE-B may determine data of logical channel with Destination1,2,3 will be scheduled by UE-A3.
- Scenario3: UE-B wants to transmit data to UE-A1,A2,A3.
- UE-A1,A2 is capable of scheduling for itself, but UE-A3 is not capable of scheduling. UE-A4 is capable of scheduling for itself and other UE. Therefore, UE-B may determine data of logical channel with Destination1 will be scheduled by UE-A. Further, UE-B may determine data of logical channel with Destination2 will be scheduled by UE-A2. In addition, UE-B may determine data of logical channel with Destination3 will be scheduled by UE-A4.

Figure 14:
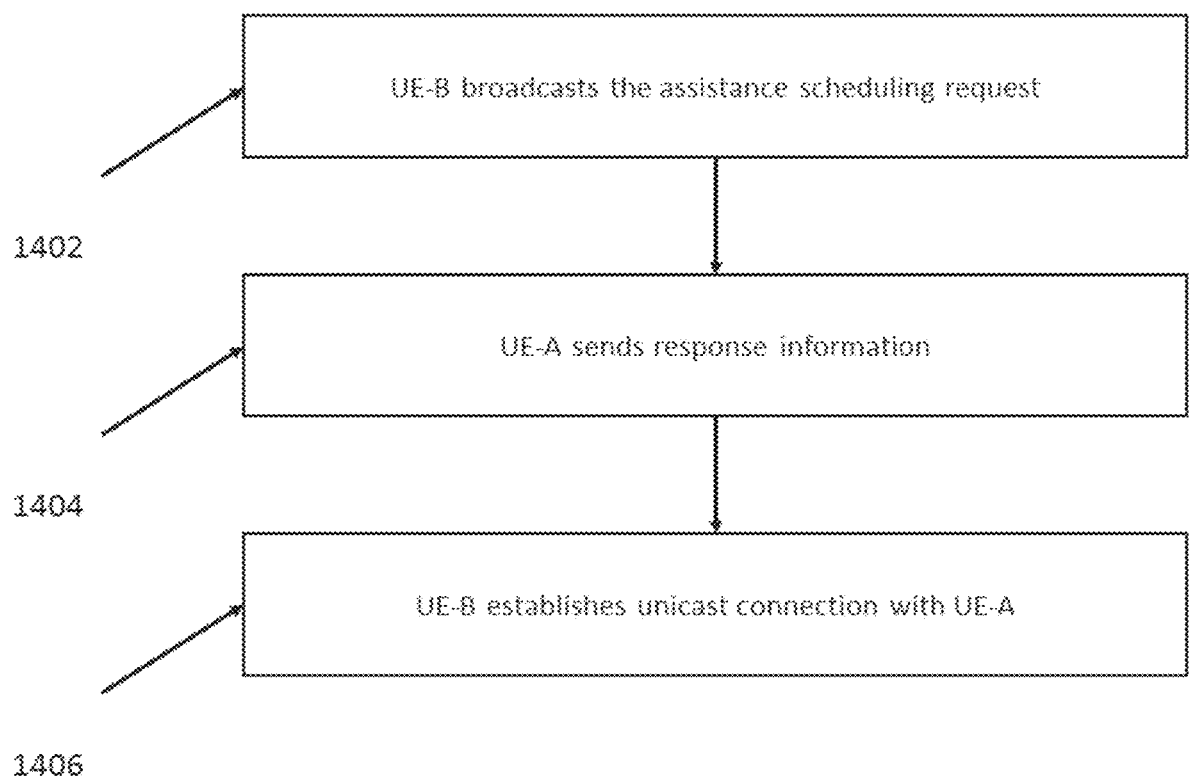
FIG. 14 illustrates a flowchart where UE-B finds another UE-A with scheduling capability.

FIG. 14 illustrates a flowchart where UE-B finds another UE-A with scheduling capability. In step 1402, UE-B broadcasts the assistance scheduling request. In step 1404, UE-A sends response information. In step 1406, UE-B establishes unicast connection with UE-A.

In an embodiment, UE-B groupcasts an assistance scheduling request within all UE-B's group. In another embodiment, UE-B first checks whether UEs have a unicast link with UE-B are capable of providing assistance scheduling. If not, groupcast assistance scheduling request within all UE-B's group, and if no response is received, the, UE-B broadcast the request.

In one embodiment, the assistance scheduling request include one of: an indication of providing assistance scheduling for all UE-B's traffic With respect to step 1404, The response information includes: an indication of providing assistance scheduling for all UE-B's traffic, destination layer 2 ID of UE-A for unicast link, resource selection mode: sensing/partial sensing/scheduling by base station, coverage states: in coverage, out of coverage, or RRC states: RRC connection, RRC idle, RRC inactive With respect to step 1406, in an embodiment, UE-B may receive multiple response message from UE-A, and UE-B chooses one UE-A to establish a connection with. UE-A shall be prioritised to be chosen in accordance with the following order (highest priority listed first): RRC connection, RRC inactive, RRC idle. In another embodiment, UE-A shall be prioritised to be chosen in accordance with the following order (highest priority listed first): sensing, partial sensing. In an embodiment, UE-A shall be prioritised to be chosen in accordance with the following order (highest priority listed first): in coverage, out of coverage. In an embodiment, UE-A shall be prioritised to be chosen in accordance with the following order (highest priority listed first): Header UE within same group with UE-B, UE-A within same group with UE-B, UE-A without any unicast or groupcast link connection with UE-B.

In an embodiment, UE-B randomly selects one UE-A to establish unicast connection.

Figure 15:
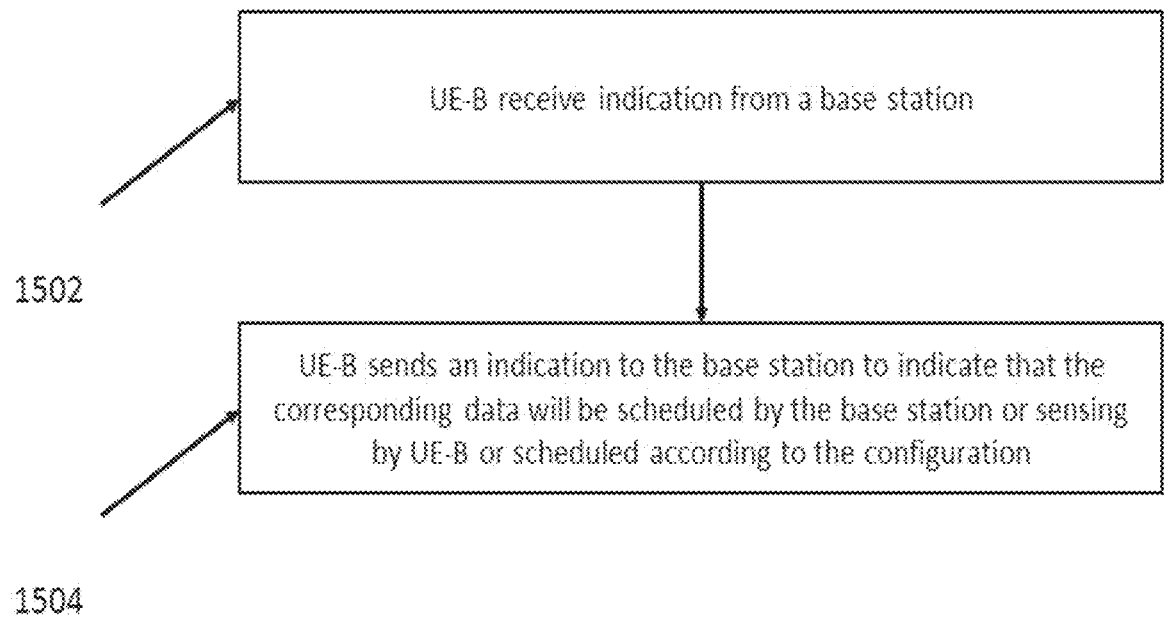
FIG. 15 illustrates a UE-B trying to find another UE to schedule traffic first.

FIG. 15 illustrates a UE-B trying to find another UE to schedule traffic first. In step 1502, UE-B receive indication from a base station. In step 1504, UE-B sends an indication to the base station to indicate that the corresponding data will be scheduled by the base station or sensing by UE-B or scheduled according to the configuration.

With respect to step 1502, in an embodiment, the indication includes:
- Whether UE-B's traffic will be scheduled by base station for the case no UE-A capable of scheduling was found
- Whether UE-B's traffic will sensing by itself for the case no UE-A capable of scheduling was found
- Whether UE-B's traffic will be scheduled by UE-A
- In another embodiment, the indication will be
- per priority/logical channel/per DRB/destination: indicates whether the data with specified priority/logical channel/per DRB/destination will be scheduled by base station or sensing by UE-B self or scheduled by UE-A
- Per CBR: indicate whether the data will be scheduled by base station or sensing by UE-B self or schedule by UE-A
- Per resource pool: indicate whether the resource pool support: UE-B be scheduled by base station or sensing by UE-B self or scheduled by UE-A In another embodiment, for the case that the indication includes scheduled by base station or sensing by UE-B itself, or scheduled by UE-A, it is up to the UE-B's specific implementation to choose between them.

Figure 16:
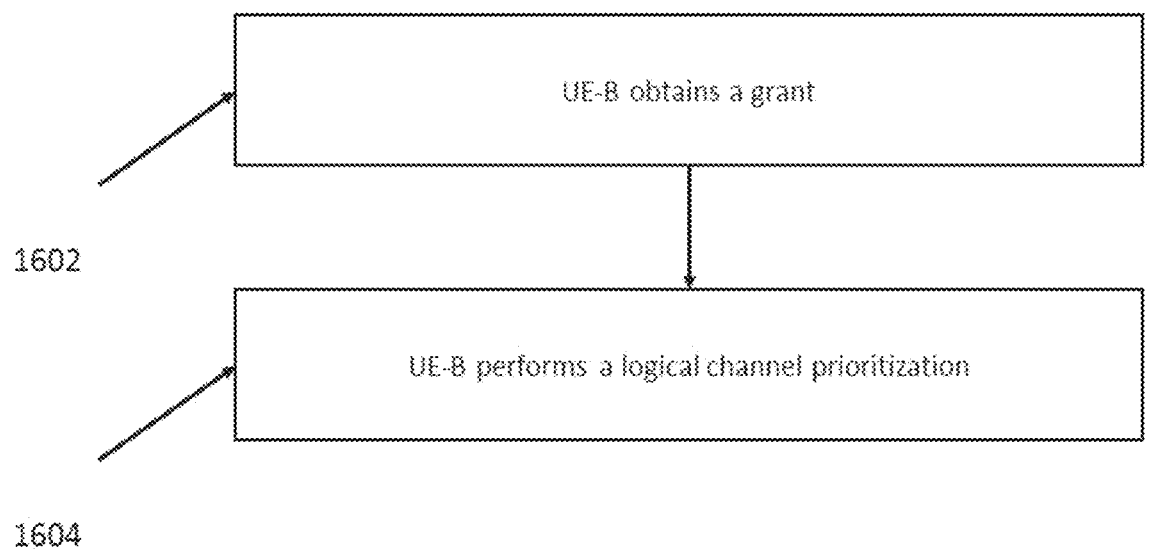
FIG. 16 illustrates a flowchart for LCP.

FIG. 16 illustrates a flowchart for LCP.

In step 1602, UE-B obtains a grant. In step 1604, UE-B performs a logical channel prioritization.

In an embodiment, the UE-B obtains a grant from: base station, created by UE-B, a UE-A capable of scheduling for itself, a UE-A capable of scheduling for itself and another UE.

In an embodiment, logical channel prioritization is performed according to:

Select a Destination associated to one of unicast, groupcast and broadcast, having the logical channel with the highest priority or the MAC CE, among the logical channels that satisfy all the following conditions and MAC CE(s), if any, for the grant associated to the SCI:

the logical channel is configured or determined to be scheduled by UE-A providing the grant the logical channel is configured or determined to be scheduled by base station providing the grant the logical channel is configured or determined to use the grant created by it self.

In an embodiment, logical channel prioritization is performed according to:

select the logical channels satisfying all the following conditions among the logical channels belonging to the selected Destination:

the logical channel is configured or determined to be scheduled by UE-A providing the grant the logical channel is configured or determined to be scheduled by base station providing the grant the logical channel is configured or determined to use the grant created by it self.

It should be understood, that the non-logical channel embodiments of the current disclosure can be applied to MAC CE.

Figure 17:
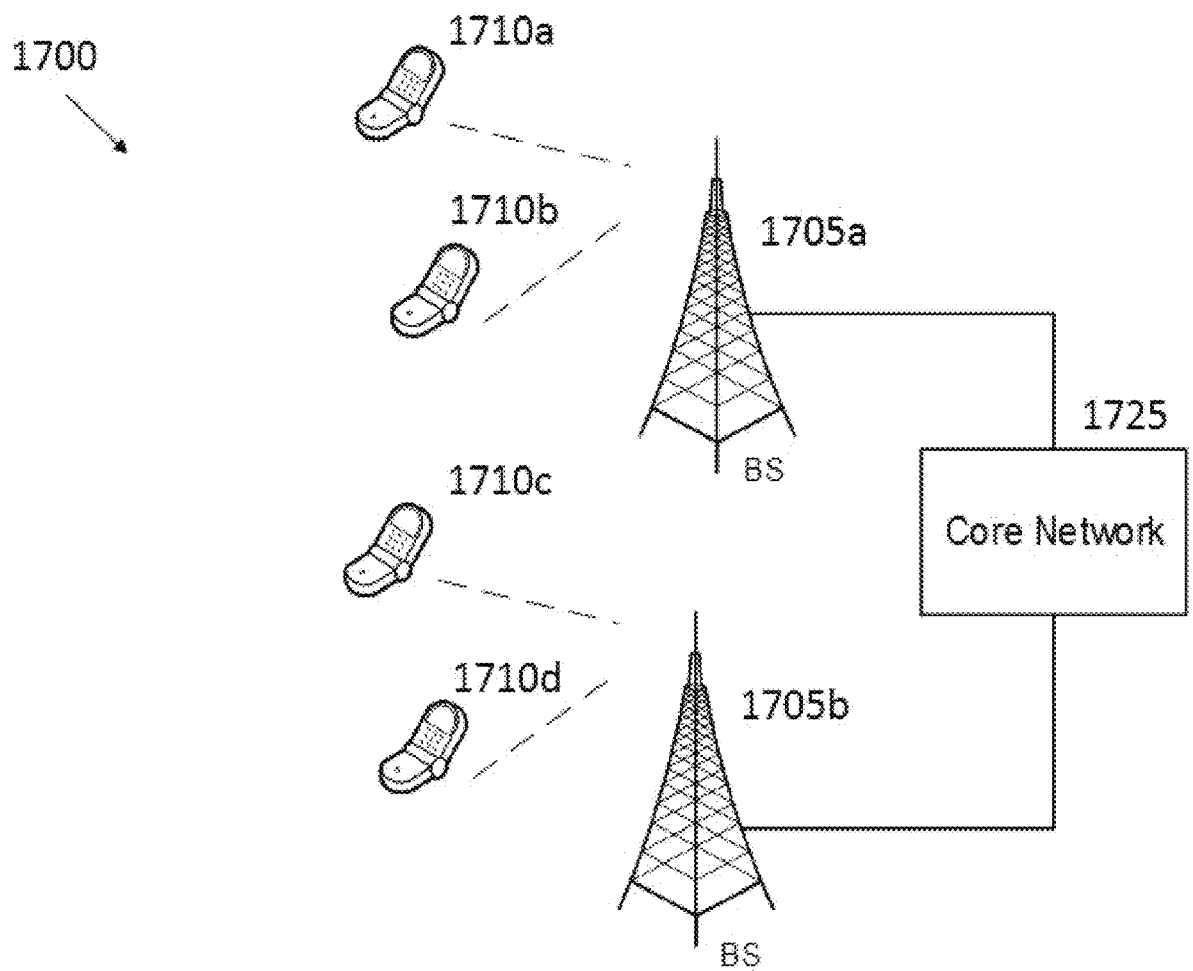
FIG. 17 shows an example of a wireless communication system where techniques in accordance with one or more embodiments of the present technology can be applied.

FIG. 17 shows an example of a wireless communication system 1700 where techniques in accordance with one or more embodiments of the present technology can be applied. A wireless communication system 1700 can include one or more base stations (BSs) 1705a, 1705b, one or more wireless devices 1710a, 1710b, 1710c, 1710d, and a core network 1725. A base station 1705a, 1705b can provide wireless service to wireless devices 1710a, 1710b, 1710c and 1710d in one or more wireless sectors. In some implementations, a base station 1705a, 1705b includes directional antennas to produce two or more directional beams to provide wireless coverage in different sectors.

The core network 1725 can communicate with one or more base stations 1405a, 1705b. The core network 1725 provides connectivity with other wireless communication systems and wired communication systems. The core network may include one or more service subscription databases to store information related to the subscribed wireless devices 1710a, 1710b, 1710c, and 1710d. A first base station 1705a can provide wireless service based on a first radio access technology, whereas a second base station 1705b can provide wireless service based on a second radio access technology. The base stations 1705a and 1705b may be co-located or may be separately installed in the field according to the deployment scenario. The wireless devices 1710a, 1710b, 1710c, and 1710d can support multiple different radio access technologies. The techniques and embodiments described in the present document may be implemented by the base stations of wireless devices described in the present document.

Figure 18:
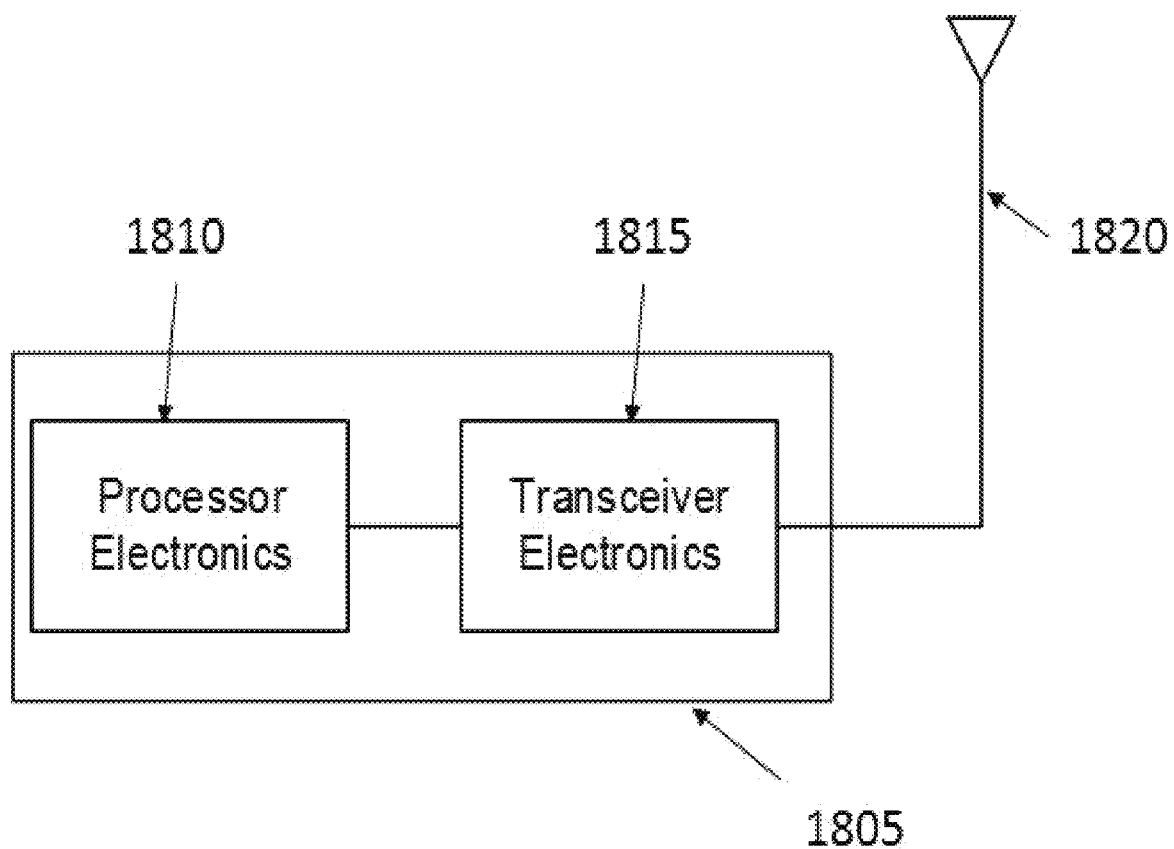
FIG. 18 is a block diagram representation of a portion of a radio station in accordance with one or more embodiments of the present technology can be applied.

FIG. 18 is a block diagram representation of a portion of a radio station in accordance with one or more embodiments of the present technology can be applied. A radio station 1805 such as a base station or a wireless device (or UE) or MT can include processor electronics 1810 such as a microprocessor that implements one or more of the wireless techniques presented in this document. The radio station 1805 can include transceiver electronics 1815 to send and/or receive wireless signals over one or more communication interfaces such as antenna 1820. The radio station 1805 can include other communication interfaces for transmitting and receiving data. Radio station 1805 can include one or more memories (not explicitly shown) configured to store information such as data and/or instructions. In some implementations, the processor electronics 1810 can include at least a portion of the transceiver electronics 1815. In some embodiments, at least some of the disclosed techniques, modules or functions are implemented using the radio station 1805. In some embodiments, the radio station 1805 may be configured to perform the methods described herein.

It will be appreciated that the present document discloses techniques that can be embodied in various embodiments and configurations. It should be understood that concepts from some embodiments can be used for other embodiments. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. An information transmission method comprising:
   transmitting, from a first wireless device, a request for scheduling information to a second wireless device;
   receiving, at the first wireless device, the scheduling information from the second wireless device, wherein the scheduling information includes a scheduling capability of the second wireless device.

2. The method according to claim 1, wherein the scheduling capability of the second wireless device includes a supported transmission resource selection method of the second wireless device, random selection, or partial sensing.

3. The method according to claim 1, further comprising receiving, at the first wireless device, the request for scheduling information from a base station before transmitting the scheduling information to a second wireless device.

4. The method according to claim 1, where the first wireless device is configured to send the scheduling information of the second wireless device to a base station after receiving the scheduling information from the second wireless device.

5. The method according to claim 4, wherein the first wireless device sends a list including scheduling information for more than one device.

6. The method according to claim 1, wherein the first wireless device is a first User Equipment (UE) and the second wireless device is a second UE.

7. The method according to claim 1, further comprising:
   transmitting, from the first wireless device, a scheduling configuration to the second wireless device; and
   receiving, from the second wireless device, a configuration response message from the second wireless device.

8. The method according to claim 7, wherein the scheduling configuration comprises: (a) a resource pool configuration, or (b) a service packet information, or (c) a service information, or (d) a scheduling request (SR) resource configuration, or (e) a radio bearer configuration, or (f) resource selection information including sensing parameters, or (g) a scheduling request configuration, or (h) a radio bearer configuration.

9. The method according to claim 7, wherein the first wireless device connects to multiple devices, and the first wireless device sends a non-overlap SR resource configurations to the multiple devices.

10. The method according to claim 7, wherein the configuration response message comprises: (a) a failure indication relating to whether a corresponding configuration failed, or (b) a collision indication relating to whether the scheduling request resource collides with another device, or (c) a scheduling request resource configuration relating to whether the SR resource configuration is commended by the second wireless device.

11. The method according to claim 7, further comprising transmitting, at the first wireless device, the configuration response message to a base station.

12. The method according to claim 7, wherein the second wireless device is configured to send the scheduling configuration to a base station.

13. The method according to claim 1, further comprising:
   receiving, at the first wireless device, a SR configuration including a sr-ProhibitTimer and a sr-TransMax, wherein an SR_COUNTER is used for a scheduling procedure for the first wireless device.

14. The method according to claim 13, wherein the sr-Prohibit timer is started, the SR_COUNTER is incremented by 1, and signal the SR to the second wireless device device's scheduling logical channel: (a. 1) if the logical channels scheduled by a UE are configured with a different SR for the SR configuration corresponding to a pending SR, or (a. 2) if the logical channels scheduled by the UE are configured with the same SR configuration for the SR configuration corresponding to the pending SR configuration, and the sr-ProhibitTimer and SR_COUNTER corresponding to the UE scheduling channel triggers the pending SR configuration, and (c) if the sr-ProhibitTimer is not running at the time of the SR transmission, and (d) if the SR_COUNTER<sr-TransMax.

15. The method according to claim 13, wherein a second wireless device is configured to provide a sidelink grant received from a base station after receiving a SR configuration from the first wireless device, wherein the second wireless device is further configured to send the SR to the base station.

16. The method according to claim 13, wherein the first wireless device is configured to associate one sr-Probihit-Timer and one SR_COUNTER to one SR configuration if logical channels scheduled by a UE is configured via a different SR configuration.

17. The method according to claim 13, wherein the first wireless device is configured to associate one sr-Porhibit-Timer and one SR_COUNTER to one SR configuration for every UE if logical channels scheduled by a UE is configured via the same SR configuration.

18. An information transmission method comprising:
receiving, at a second wireless device, a request for scheduling information from a first wireless device;
transmitting, at the second wireless device, the scheduling information to the first wireless device, wherein the scheduling information includes a scheduling capability of the second wireless device.

19. The method according to claim 18, wherein the scheduling capability of the second wireless device includes a supported transmission resource selection method of the second wireless device, random selection, or partial sensing.

20. The method according to claim 18, further comprising:
receiving, at the second wireless device, a scheduling configuration from the first wireless device; and
transmitting, from the second wireless device, a configuration response message to the first wireless device.

21. The method according to claim 20, wherein the scheduling configuration comprises: (a) a resource pool configuration, or (b) a service packet information, or (c) a service information, or (d) a scheduling request (SR) resource configuration, or (e) a radio bearer configuration, or (f) resource selection information including sensing parameters, or (g) a scheduling request configuration, or (h) a radio bearer configuration.

* * * * *